United States Patent
Koravadi (10) Patent No.: US 10,671,868 B2
(45) Date of Patent: Jun. 2, 2020

(54) VEHICULAR VISION SYSTEM USING SMART EYE GLASSES

(71) Applicant: Magna Electronics Inc., Auburn Hills, MI (US)

(72) Inventor: Krishna Koravadi, Rochester Hills, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

(21) Appl. No.: 16/149,370

(22) Filed: Oct. 2, 2018

(65) Prior Publication Data

US 2019/0102636 A1  Apr. 4, 2019

Related U.S. Application Data

(60) Provisional application No. 62/566,574, filed on Oct. 2, 2017.

(51) Int. Cl.
| | | |
|---|---|---|
| *G08B 23/00* | (2006.01) | |
| *G06K 9/00* | (2006.01) | |
| *H04N 7/18* | (2006.01) | |
| *G08B 21/06* | (2006.01) | |
| *G02B 27/01* | (2006.01) | |
| *H04W 4/48* | (2018.01) | |
| *H04W 4/90* | (2018.01) | |
| *H04W 4/80* | (2018.01) | |

(52) U.S. Cl.
CPC ....... *G06K 9/00845* (2013.01); *G02B 27/017* (2013.01); *G02B 27/0172* (2013.01); *G06K 9/00604* (2013.01); *G08B 21/06* (2013.01); *H04N 7/183* (2013.01); *H04N 7/188* (2013.01); *H04W 4/48* (2018.02); *H04W 4/80* (2018.02); *H04W 4/90* (2018.02); *G02B 2027/014* (2013.01); *G02B 2027/0138* (2013.01); *G02B 2027/0178* (2013.01); *G02B 2027/0181* (2013.01)

(58) Field of Classification Search
CPC .......... G06K 9/00845; G06K 9/00604; G08B 21/06; H04N 7/183; H04N 7/188; H04W 4/48; H04W 4/80; H04W 4/90; G02B 27/0172; G02B 2027/0138; G02B 2027/014; G02B 2027/0178; G02B 2027/0181; G02B 27/017
USPC ........................ 340/576, 573.1, 937; 345/156
See application file for complete search history.

(56) References Cited

U.S. PATENT DOCUMENTS

| | | |
|---|---|---|
| 5,457,493 A | 10/1995 | Leddy et al. |
| 5,550,677 A | 8/1996 | Schofield et al. |
| 5,670,935 A | 9/1997 | Schofield et al. |
| 5,796,094 A | 8/1998 | Schofield et al. |

(Continued)

*Primary Examiner* — Anh V La
(74) *Attorney, Agent, or Firm* — Honigman LLP (57) ABSTRACT

A vision system for a vehicle includes a control and smart eye glasses worn by a driver of the vehicle. The smart eye glasses include a driver monitoring camera that has a field of view that encompasses at least one eye of the driver when wearing the smart eye glasses. The control includes an image processor that processes image data captured by the driver monitoring camera to determine drowsiness of the driver. Responsive to determination that the driver is drowsy, the control communicates a signal to a portable device in the vehicle and the portable device in the vehicle generates an alert to the driver.

20 Claims, 5 Drawing Sheets

(56) References Cited

U.S. PATENT DOCUMENTS

| | | |
|---|---|---|
| 5,877,897 A | 3/1999 | Schofield et al. |
| 5,949,331 A | 9/1999 | Schofield et al. |
| 6,313,454 B1 | 11/2001 | Bos et al. |
| 6,320,176 B1 | 11/2001 | Schofield et al. |
| 6,353,392 B1 | 3/2002 | Schofield et al. |
| 6,396,397 B1 | 5/2002 | Bos et al. |
| 6,477,464 B2 | 11/2002 | McCarthy et al. |
| 6,497,503 B1 | 12/2002 | Dassanayake et al. |
| 6,498,620 B2 | 12/2002 | Schofield et al. |
| 6,678,614 B2 | 1/2004 | McCarthy et al. |
| 6,690,268 B2 | 2/2004 | Schofield et al. |
| 6,806,452 B2 | 10/2004 | Bos et al. |
| 6,824,281 B2 | 11/2004 | Schofield et al. |
| 6,946,978 B2 | 9/2005 | Schofield |
| 6,975,775 B2 | 12/2005 | Rykowski et al. |
| 7,004,593 B2 | 2/2006 | Weller et al. |
| 7,004,606 B2 | 2/2006 | Schofield |
| 7,005,974 B2 | 2/2006 | McMahon et al. |
| 7,038,577 B2 | 5/2006 | Pawlicki et al. |
| 7,062,300 B1 | 6/2006 | Kim |
| 7,065,432 B2 | 6/2006 | Moisel et al. |
| 7,123,168 B2 | 10/2006 | Schofield |
| 7,167,796 B2 | 1/2007 | Taylor et al. |
| 7,227,611 B2 | 6/2007 | Hull et al. |
| 7,526,103 B2 | 4/2009 | Schofield et al. |
| 7,639,149 B2 | 12/2009 | Katoh |
| 7,720,580 B2 | 5/2010 | Higgins-Luthman |
| 7,855,755 B2 | 12/2010 | Weller et al. |
| 7,914,187 B2 | 3/2011 | Higgins-Luthman et al. |
| 9,280,202 B2 | 3/2016 | Gieseke et al. |
| 9,499,139 B2 | 11/2016 | Koravadi |
| 9,688,199 B2 | 6/2017 | Koravadi |
| 9,729,636 B2 | 8/2017 | Koravadi et al. |
| 9,743,002 B2 | 8/2017 | Wierich |
| 2004/0114381 A1 | 6/2004 | Salmeen et al. |
| 2008/0088527 A1 | 4/2008 | Fujimori et al. |
| 2010/0253597 A1 | 10/2010 | Seder et al. |
| 2013/0127980 A1 | 5/2013 | Haddick et al. |
| 2013/0194426 A1 | 8/2013 | Schofield et al. |
| 2014/0098008 A1 | 4/2014 | Hatton |
| 2014/0139676 A1 | 5/2014 | Wierich |
| 2014/0333729 A1 | 11/2014 | Pflug |
| 2014/0336876 A1 | 11/2014 | Gieseke et al. |
| 2015/0009010 A1 | 1/2015 | Biemer |
| 2015/0015710 A1 | 1/2015 | Tiryaki |
| 2015/0022664 A1 | 1/2015 | Pflug et al. |
| 2015/0092042 A1 | 4/2015 | Fursich |
| 2015/0112586 A1 | 4/2015 | Ihara et al. |
| 2015/0182759 A1* | 7/2015 | Baek ............... A61N 5/0618 359/566 |
| 2015/0213634 A1* | 7/2015 | Karmarkar ............ G06T 11/60 345/589 |
| 2015/0232030 A1 | 8/2015 | Bongwald |
| 2015/0294169 A1 | 10/2015 | Zhou et al. |
| 2015/0296135 A1 | 10/2015 | Wacquant et al. |
| 2015/0352953 A1 | 12/2015 | Koravadi |
| 2016/0137126 A1 | 5/2016 | Fursich et al. |
| 2016/0207539 A1* | 7/2016 | Jung ..................... G06F 3/013 |
| 2016/0304099 A1* | 10/2016 | Hatakeyama ........ A61B 5/1103 |
| 2017/0066440 A1 | 3/2017 | Koravadi |
| 2017/0274906 A1 | 9/2017 | Hassan et al. |
| 2017/0330042 A1* | 11/2017 | Vaziri .................. G02B 13/16 |
| 2017/0368994 A1 | 12/2017 | Gieseke et al. |
| 2018/0082315 A1 | 3/2018 | Smid et al. |

\* cited by examiner

FIG. 8

VEHICULAR VISION SYSTEM USING SMART EYE GLASSES

CROSS REFERENCE TO RELATED APPLICATION

The present application claims the filing benefits of U.S. provisional application Ser. No. 62/566,574, filed Oct. 2, 2017, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a driver assistance system or vision system or imaging system for a vehicle that comprises a method and apparatus or system to provide enhanced driver drowsiness monitoring and enhanced heads up display features for a driver. The system may also provide enhanced viewing by the driver of areas blocked or obstructed by parts of the vehicle (and that are within the field of view of one or more exterior viewing cameras of the vehicle). The system utilizes smart glasses that have multiple functionalities. For example, the system and smart glasses may function as a drowsiness monitoring device and may be interfaced with a vehicle network and/or a mobile device to advise the driver to take a rest, or the system and smart glasses may function as a heads up display to display or project images for viewing by the driver and to overlay information for viewing by the driver, or the system and smart glasses may function to overlay images derived from image data captured by one or more exterior viewing cameras (and displayed at or projected by the smart glasses) to provide the driver the ability to effectively see through the body of the vehicle.

These and other objects, advantages, purposes and features of the present invention will become apparent upon review of the following specification in conjunction with the drawings.

LEGEND

100—Smart eye glasses
102—Wide angle lens camera
104—Driver eye monitoring utilizing a gyro sensor and camera image data of the user's or wearer's eye
106—Wireless communication module that can communicate with a mobile device or vehicle ECU
108—Gyro sensor, to detect the head orientation and movement
110—Heads up display control module
112—Chargeable energy source (e.g., chargeable battery)
114—Projector that is an integral part of the eye glasses to overlay the heads up display information
116—Electronic Control Unit (ECU) that is interfaced with the vehicle communication network or bus and vehicle cameras
118—Higher bandwidth wireless communication link between the smart glasses and the ECU
119—Low bandwidth wireless communication link between the smart glasses and a mobile phone
120—Surround view vehicle camera sensors
121—Mobile phone
122—Field of view of the camera (102) of the smart glasses
124—Glass surface of the smart eye glasses
125—Vehicle door surface
126—Outside camera image superimposed over the door surface
128—Vehicle hood
130—Front camera view superimposed over the vehicle hood

DESCRIPTION OF THE PREFERRED EMBODIMENTS

At present, driver monitoring is performed using one or more cameras mounted on the vehicle dash board monitoring the driver's face. If the driver is wearing sunglasses it may be more challenging to detect driver drowsiness.

Figure 1:
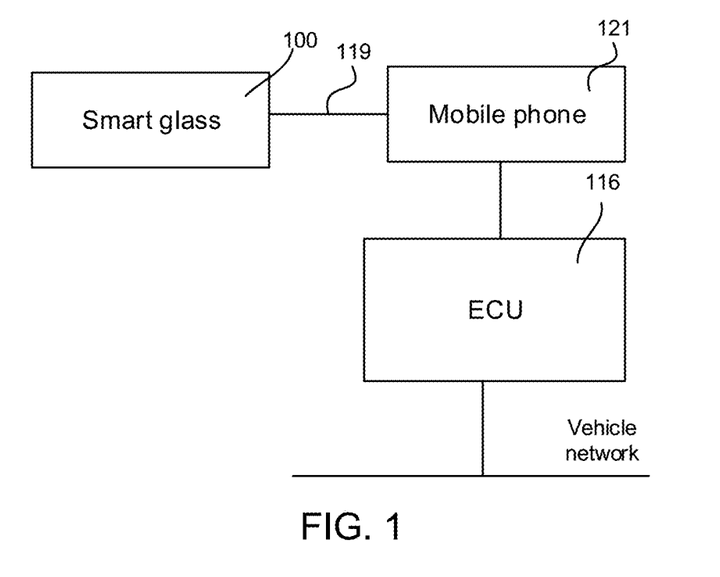
FIG. 1 is a block diagram of a system of smart glasses connected to vehicle network via mobile device in accordance with the present invention.

FIG. 1 illustrates a system block diagram of the smart glasses 100 connected to the vehicle network via a mobile phone 121, in which the smart glasses 100 (when worn by the driver) monitor the driver's eye or eyes and sends the information on the eye status to the mobile device 121, such as through a low bandwidth communication link 119. The mobile phone 121 is also connected to the vehicle ECU 116, which internally has access to the vehicle network. The application running in the mobile phone 121 utilizes the eye status from the smart glass 100 and the vehicle steering information from the vehicle ECU 116 and can determine the driver's drowsiness and alert the driver to take a rest.

Figure 3:
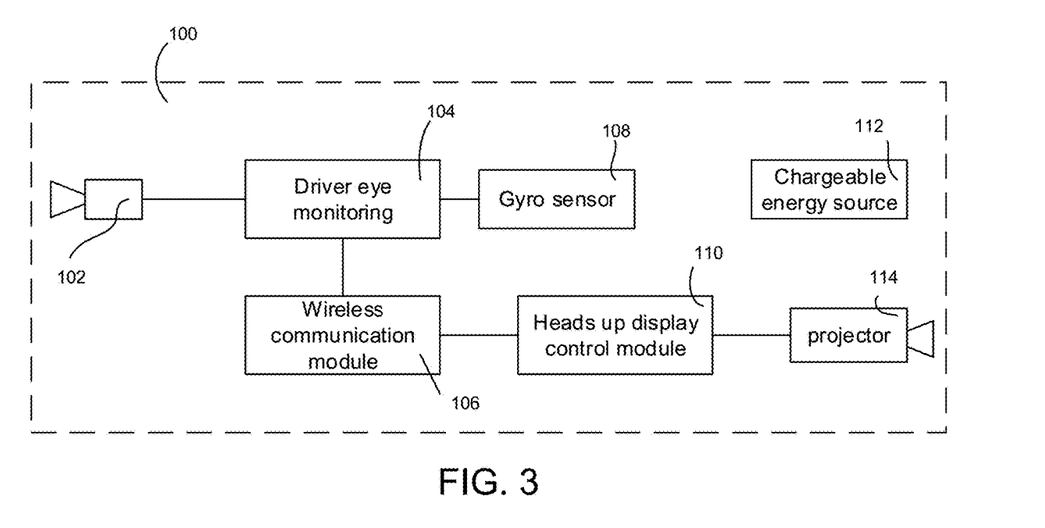
FIG. 3 is a block diagram of the smart glasses device and system.

FIG. 3 illustrates the block diagram of the smart eye glasses 100 that comprise a wide angle lens camera 102, which provides the driver eye information to a driver eye monitoring module 104. The driver eye monitoring module 104 also utilizes information from a gyro sensor 108 to detect the head movement, and the image data and head movement information is transmitted to the mobile phone 121, which determines the driver drowsiness in combination with the vehicle data. Heads up display functionality is achieved by projecting the overlay data (utilizing the projector 114) that is to be displayed to the driver. The overlay data may be transmitted to the smart eye glasses 100 from the mobile device 121 via a wireless communication link 119, which internally extracts the information from the vehicle ECU 116 or other applications such as map application running in the mobile device 121.

The system may utilize aspects of head and face direction and position tracking systems and/or eye tracking systems and/or gesture recognition systems. Such head and face direction and/or position tracking systems and/or eye tracking systems and/or gesture recognition systems may utilize aspects of the systems described in U.S. Publication Nos. US-2016-0137126; US-2015-0352953; US-2015-0296135; US-2015-0294169; US-2015-0232030; US-2015-0092042; US-2015-0022664; US-2015-0015710; US-2015-0009010 and/or US-2014-0336876, which are hereby incorporated herein by reference in their entireties. The system may also or otherwise utilize aspects of communication systems and/or monitoring systems of the types described in U.S. Pat. Nos. 9,729,636; 9,688,199 and/or 9,499,139, and/or U.S. Publication Nos. US-2018-0082315; US-2017-0368994, US-2017-0274906; US-2017-0066440; US-2015-0352953; US-2015-0092042 and/or US-2015-0232030, which are all hereby incorporated herein by reference in their entireties.

Figure 4:
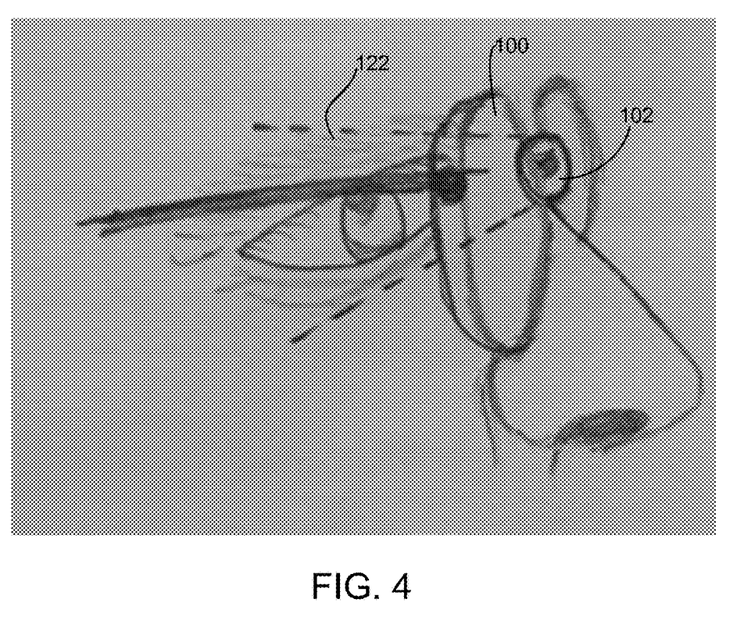
FIG. 4 is a side view of the smart glasses monitoring the user's eye for drowsiness detection.
Figure 5:
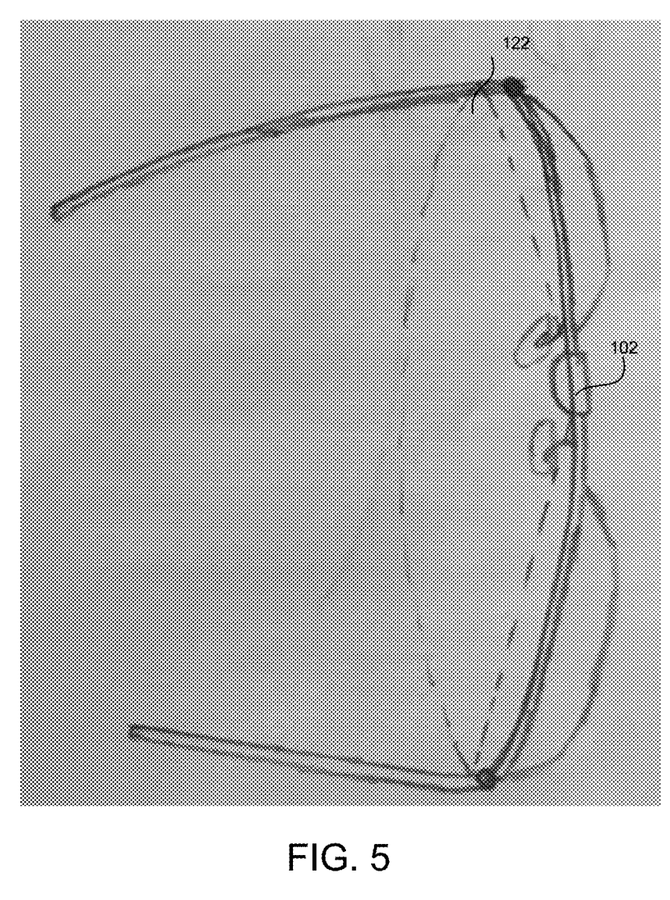
FIG. 5 is a top view of the smart glasses with a camera's field of view to monitor the eyes of a person wearing the smart eye glasses.
Figure 6:
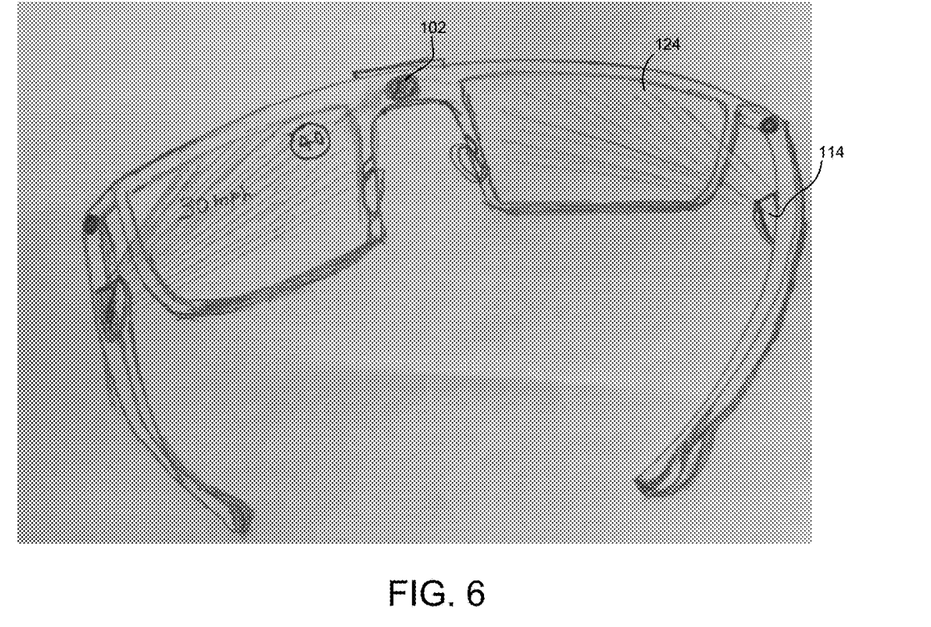
FIG. 6 is a perspective view of the smart glasses with side projectors to act as a heads up display.

FIGS. 4 and 5 illustrate the field of view 122 of the wide angle lens camera 102 which is the integral part of the smart eye glasses 100. FIG. 6 illustrates a perspective view of the smart eye glasses 100 with the projector 114 operable to project heads up display information on or at the glass or lens 124 of the smart glasses 100. The information may include vehicle status information, such as the current speed and speed limit at the location of the vehicle, or may include status information pertaining to any system or accessory of the vehicle, such as oil life, tire pressure, engine diagnostics, trip information and/or the like. The information may be received by the smart glasses from the vehicle ECU, such as via wireless communication or the like.

In some environments it will be very useful if the driver could see through the body of the vehicle (such as by utilizing aspects of the systems described in U.S. Pat. No. 9,743,002, which is hereby incorporated herein by reference in its entirety).

Figure 2:
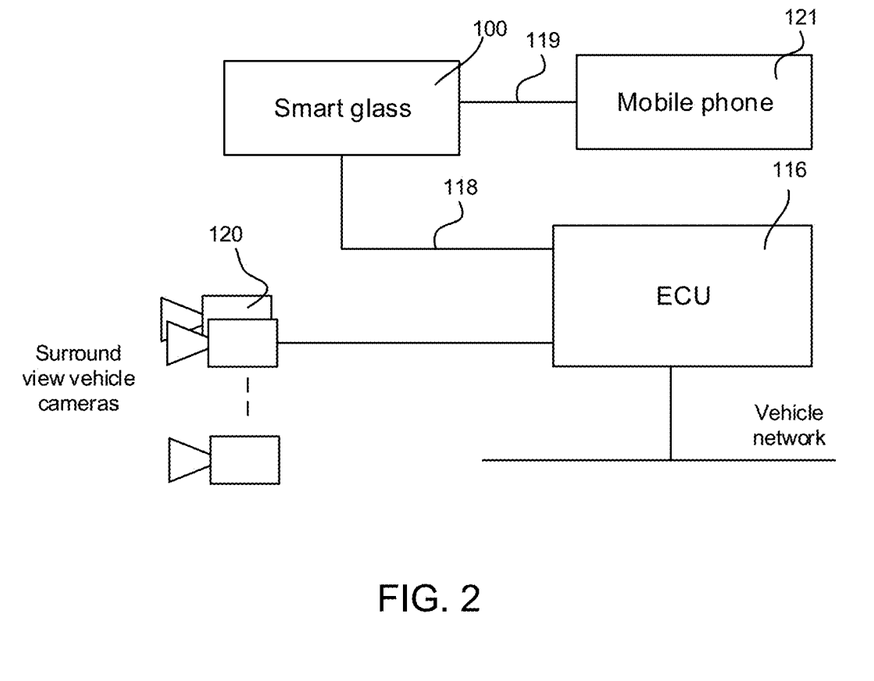
FIG. 2 is a system block diagram of the smart glasses in communication with surround view vehicle cameras.
Figure 7:
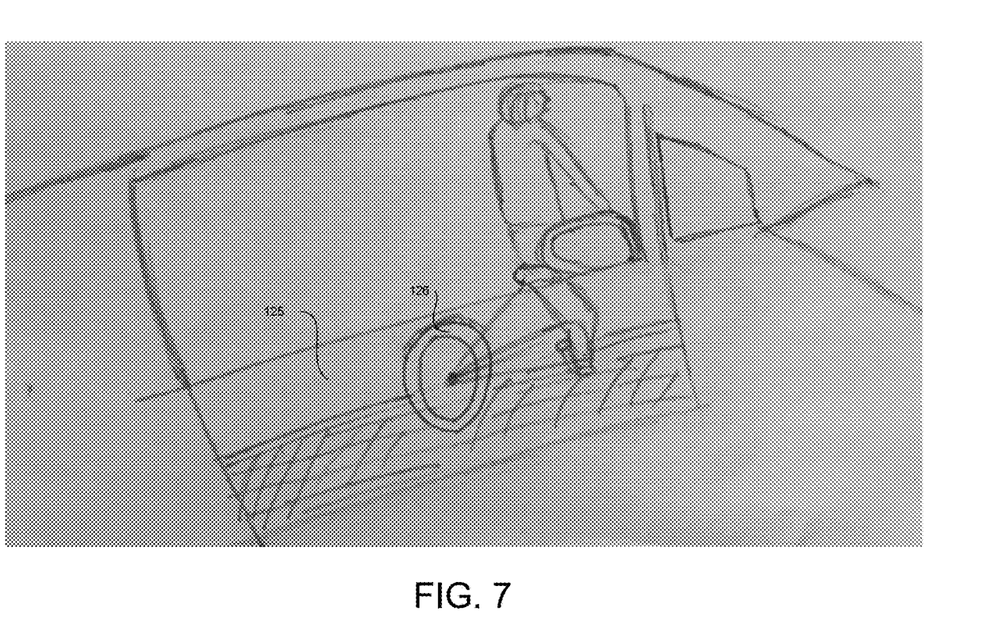
FIG. 7 is a view of the door of the vehicle via the smart glasses, showing images derived from image data captured by an exterior viewing camera of the vehicle in accordance with the present invention.
Figure 8:
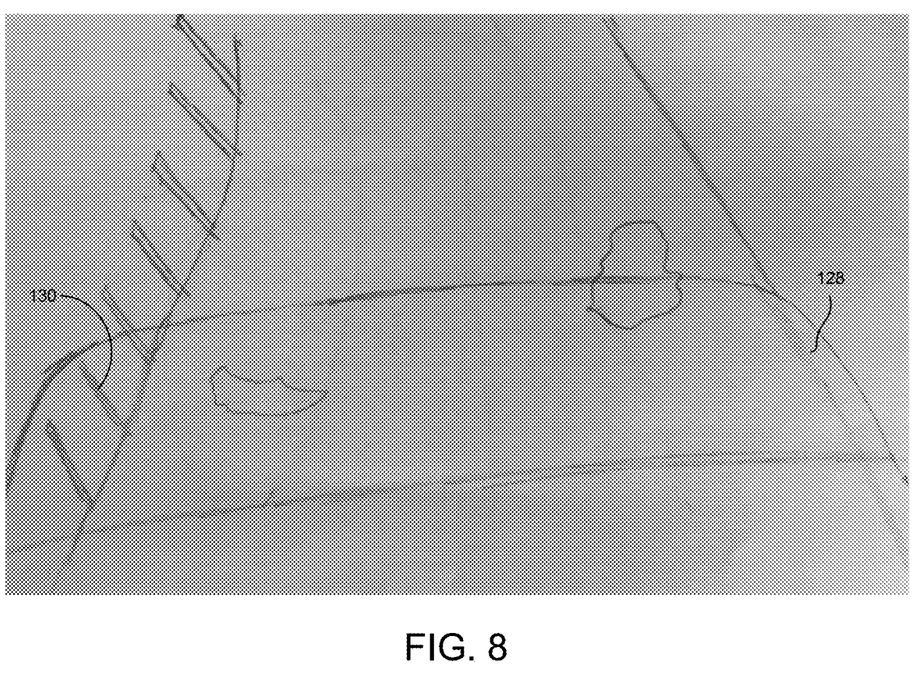
FIG. 8 is a view of the vehicle hood via the smart glasses, showing images derived from image data captured by an exterior viewing camera of the vehicle in accordance with the present invention.

FIG. 2 illustrates a system block diagram of a display system that includes the smart glasses 100, with surround view vehicle cameras 120 and with a high bandwidth wireless communication link 118 so that the smart glasses can overlay images derived from image data captured by one or more of the surround view cameras to provide a better view of the surrounding for the driver, such as shown in FIG. 7 (where the displayed images include images captured by a sideward viewing camera so that the driver wearing the smart glasses is effectively viewing through the door of the vehicle) and FIG. 8 (where the displayed images include images captured by a forward and/or sideward viewing camera so that the driver wearing the smart glasses is effectively viewing through the front portion of the vehicle). A transparent view may be useful for the driver to drive the vehicle in a difficult environments such as off road driving or dense traffic situations.

Thus, the smart glasses of the present invention may be operable in conjunction with a surround view vision system of the vehicle, which includes a plurality of cameras disposed at the vehicle and having respective fields of view exterior the vehicle. The vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EyeQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252 and/or 6,642,851, and/or U.S. Publication Nos. US-2014-0022390; US-2012-0162427; US-2006-0050018 and/or US-2006-0061008, which are all hereby incorporated herein by reference in their entireties. Optionally, the vision system (utilizing the forward viewing camera and a rearward viewing camera and other cameras disposed at the vehicle with exterior fields of view) may be part of or may provide a display of a top-down view or bird's-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vision system for a vehicle, said vision system comprising:
   at least one vehicle-based camera disposed at a vehicle and having a field of view exterior of the vehicle;
   a vehicle-based image processor disposed at the vehicle for processing image data captured by said at least one camera;
   smart eye glasses worn by a driver of the vehicle, said smart eye glasses comprising a driver monitoring camera that has a field of view that encompasses at least one eye of the driver when wearing said smart eye glasses;
   wherein said smart eye glasses comprise a heads up display control module that is operable to display information for viewing by the driver when the driver is wearing the smart eye glasses and driving the vehicle;
   a control comprising an image processor that processes image data captured by said driver monitoring camera to determine drowsiness of the driver;
   wherein, responsive to determination that the driver is drowsy while the driver is driving the vehicle, said control wirelessly communicates a signal to a portable device in the vehicle and the device in the vehicle generates an alert to the driver; and
   wherein, responsive to determination that the driver is viewing toward a body structure of the vehicle, said heads up display control module displays images derived from image data captured by said at least one vehicle-based camera to display part of the exterior scene at said smart eye glasses such that the driver effectively views through the body structure of the vehicle.

2. The vision system of claim 1, wherein said control is part of said smart eye glasses.

3. The vision system of claim 1, wherein the portable device in the vehicle comprises the driver's smart phone.

4. The vision system of claim 1, wherein said smart eye glasses include a gyro sensor, and wherein said control determines drowsiness of the driver at least in part responsive to an output of said gyro sensor.

5. The vision system of claim 1, wherein the information displayed for viewing by the driver when the driver is wearing the smart eye glasses and driving the vehicle comprises vehicle information received at said heads up display control module of said smart glasses from an electronic control unit of the vehicle.

6. The vision system of claim 5, wherein said at least one vehicle-based camera comprises a plurality of vehicle-based cameras having respective fields of view exterior of the vehicle.

7. The vision system of claim 6, wherein the displayed images derived from image data captured by said at least one vehicle-based camera comprise images overlayed over the driver's view through said smart eye glasses.

8. The vision system of claim 6, wherein said heads up display control module projects images and information for viewing by the driver when the driver is wearing said smart eye glasses.

9. The vision system of claim 8, wherein the information includes vehicle status information.

10. A vision system for a vehicle, said vision system comprising:
- at least one vehicle-based camera disposed at a vehicle and having a field of view exterior of the vehicle;
- a vehicle-based image processor disposed at the vehicle for processing image data captured by said at least one camera;
- smart eye glasses worn by a driver of the vehicle, said smart eye glasses comprising a driver monitoring camera that has a field of view that encompasses at least one eye of the driver when wearing said smart eye glasses;
- wherein said smart eye glasses comprise a heads up display control module that is operable to display information for viewing by the driver when the driver is wearing the smart eye glasses and driving the vehicle;
- wherein said smart eye glasses comprises a control comprising an image processor that processes image data captured by said driver monitoring camera to determine drowsiness of the driver;
- wherein, responsive to determination that the driver is drowsy while the driver is driving the vehicle, said control communicates a signal to a portable device in the vehicle and the device in the vehicle generates an alert to the driver;
- wherein the portable device in the vehicle comprises the driver's smart phone; and
- wherein, responsive to determination that the driver is viewing toward a body structure of the vehicle, said heads up display control module displays images derived from image data captured by said at least one vehicle-based camera to display part of the exterior scene at said smart eye glasses such that the driver effectively views through the body structure of the vehicle.

11. The vision system of claim 10, wherein said smart eye glasses include a gyro sensor, and wherein said control determines drowsiness of the driver at least in part responsive to an output of said gyro sensor.

12. The vision system of claim 10, wherein the information displayed for viewing by the driver when the driver is wearing the smart eye glasses and driving the vehicle comprises vehicle information received at said heads up display control module of said smart glasses from an electronic control unit of the vehicle.

13. The vision system of claim 12, wherein said at least one vehicle-based camera comprises a plurality of vehicle-based cameras having respective fields of view exterior of the vehicle.

14. The vision system of claim 13, wherein the displayed images derived from image data captured by said at least one vehicle-based camera comprise images overlayed over the driver's view through said smart eye glasses.

15. The vision system of claim 13, wherein said heads up display control module projects images and information for viewing by the driver when the driver is wearing said smart eye glasses.

16. The vision system of claim 15, wherein the information includes vehicle status information.

17. A vision system for a vehicle, said vision system comprising:
- smart eye glasses worn by a driver of the vehicle, said smart eye glasses comprising a driver monitoring camera that has a field of view that encompasses at least one eye of the driver when wearing said smart eye glasses;
- a control comprising an image processor that processes image data captured by said driver monitoring camera to determine drowsiness of the driver;
- at least one vehicle-based camera disposed at a vehicle and having a field of view exterior of the vehicle, wherein the image processor processes image data captured by said at least one vehicle-based camera;
- wherein, responsive to determination that the driver is drowsy while the driver is driving the vehicle, said control communicates a signal to a portable device in the vehicle and the device in the vehicle generates an alert to the driver;
- wherein, responsive to determination that the driver is viewing toward a structure of the vehicle, said smart eye glasses display images derived from image data captured by the at least one vehicle-based camera to display part of the exterior scene at said smart eye glasses such that the driver effectively views through the structure of the vehicle;
- wherein said smart eye glasses display vehicle status information for viewing by the driver when the driver is wearing said smart eye glasses and driving the vehicle; and
- wherein the information displayed for viewing by the driver when the driver is wearing the smart eye glasses and driving the vehicle comprises vehicle information received at said smart glasses from an electronic control unit of the vehicle.

18. The vision system of claim 17, wherein said control is part of said smart eye glasses.

19. The vision system of claim 17, wherein the portable device in the vehicle comprises the driver's smart phone.

20. The vision system of claim 17, wherein said smart eye glasses include a gyro sensor, and wherein said control determines drowsiness of the driver at least in part responsive to an output of said gyro sensor.

* * * * *